US007338709B1

(12) United States Patent
Wada et al.

(10) Patent No.: US 7,338,709 B1
(45) Date of Patent: Mar. 4, 2008

(54) SECURITY YARN AND PRODUCTION METHOD THEREFOR

(75) Inventors: Tetsuro Wada, Yokohama (JP); Katsumi Matsumura, Hino (JP)

(73) Assignees: Toska Co., Ltd., Tokyo (JP); Unitika Ltd., Hyogo (JP)

( * ) Notice: Subject to any disclaimer, the term of this patent is extended or adjusted under 35 U.S.C. 154(b) by 972 days.

(21) Appl. No.: 09/763,515

(22) PCT Filed: Jul. 10, 2000

(86) PCT No.: PCT/JP00/04584

§ 371 (c)(1), (2), (4) Date: Feb. 23, 2001

(87) PCT Pub. No.: WO01/04856

PCT Pub. Date: Jan. 18, 2001

(30) Foreign Application Priority Data

Jul. 9, 1999 (JP) ................................ 11/195919

(51) Int. Cl.
*B32B 15/00* (2006.01)
*D02G 3/36* (2006.01)

(52) U.S. Cl. ...................... 428/379; 428/364; 428/377; 428/385; 57/210; 57/212; 57/223; 57/3; 57/7; 57/9

(58) Field of Classification Search ................ 428/364, 428/375, 373, 377, 379, 383, 609, 611, 381, 428/384, 385
See application file for complete search history.

(56) References Cited

U.S. PATENT DOCUMENTS

| | | | | | |
|---|---|---|---|---|---|
| 3,920,409 | A | * | 11/1975 | Taniguchi | 428/673 |
| 4,114,032 | A | * | 9/1978 | Brosow et al. | 235/493 |
| 4,218,674 | A | * | 8/1980 | Brosow et al. | 340/5.86 |
| 4,301,428 | A | * | 11/1981 | Mayer | 333/12 |
| 5,181,021 | A | | 1/1993 | Lee et al. | |
| 5,464,695 | A | * | 11/1995 | Kawamoto et al. | 428/370 |
| 5,516,153 | A | * | 5/1996 | Kaule | 283/85 |
| 5,587,703 | A | * | 12/1996 | Dumont | 340/568.2 |
| 5,614,824 | A | * | 3/1997 | Dames et al. | 324/239 |
| 5,689,237 | A | * | 11/1997 | Sasagawa et al. | 340/572.8 |
| 5,697,649 | A | * | 12/1997 | Dames et al. | 283/83 |

(Continued)

FOREIGN PATENT DOCUMENTS

DE 29 31 932 A1 2/1998

(Continued)

*Primary Examiner*—Jill Gray
(74) *Attorney, Agent, or Firm*—Connolly Bove Lodge & Hutz LLP

(57) ABSTRACT

According to the present invention, there is provided a security thread whose existence is not clarified, which is prevented beforehand from being removed, which can be attached even to a form of a commodity heretofore regarded as difficult, and whose use purpose range is enlarged, and the security thread can be constituted by a core member comprising a soft magnetic fiber (1) or the soft magnetic fiber and a core thread (4), and a cover member (2, 3) comprising a nonmetal material to cover the core member, constituted by covering the core member comprising the soft magnetic fiber or the soft magnetic fiber and core thread and a semi-hard magnetic material (10') with the cover member, or constituted by covering the soft magnetic fiber or the core member comprising the soft magnetic fiber and a thermal welding thread (9) with the cover member.

4 Claims, 5 Drawing Sheets

U.S. PATENT DOCUMENTS

| | | | | |
|---|---|---|---|---|
| 5,717,382 | A | 2/1998 | Cooper | |
| 5,728,237 | A * | 3/1998 | Herzer | 148/304 |
| 5,834,748 | A * | 11/1998 | Litman | 235/450 |
| 5,851,668 | A * | 12/1998 | Sandor et al. | 428/397 |
| 5,896,087 | A | 4/1999 | Frowein | |
| 5,976,998 | A * | 11/1999 | Sandor et al. | 442/365 |
| 5,988,500 | A * | 11/1999 | Litman | 235/450 |
| 6,053,406 | A * | 4/2000 | Litman | 235/449 |
| 6,103,372 | A * | 8/2000 | Sandor et al. | 428/364 |
| 6,127,028 | A * | 10/2000 | Sandor et al. | 428/222 |
| 6,159,599 | A * | 12/2000 | Sandor et al. | 428/373 |
| 6,162,538 | A * | 12/2000 | LaNieve et al. | 428/373 |
| 6,210,798 | B1 * | 4/2001 | Sandor et al. | 428/364 |
| 6,254,002 | B1 * | 7/2001 | Litman | 235/450 |
| 6,441,737 | B1 * | 8/2002 | Antonenco et al. | 340/572.1 |
| 6,610,425 | B2 * | 8/2003 | Sawa et al. | 428/800 |
| 6,708,880 | B1 * | 3/2004 | Acher et al. | 235/451 |
| 6,735,895 | B2 * | 5/2004 | Wada et al. | 40/664 |
| 6,774,793 | B1 * | 8/2004 | Brauer et al. | 340/572.3 |
| 6,869,700 | B2 * | 3/2005 | Sawa et al. | 428/692.1 |
| 2002/0152589 | A1 * | 10/2002 | Wada et al. | 24/16 PB |
| 2003/0059609 | A1 * | 3/2003 | Rodgers | 428/373 |
| 2003/0085809 | A1 * | 5/2003 | Antonenco et al. | 340/572.6 |

FOREIGN PATENT DOCUMENTS

| | | | |
|---|---|---|---|
| EP | 0 822 527 | A1 | 2/1998 |
| EP | 833351 | A1 * | 4/1998 |
| EP | 0 893 562 | A1 | 1/1999 |
| EP | 1111564 | A2 * | 6/2001 |

* cited by examiner

SECURITY YARN AND PRODUCTION METHOD THEREFOR

TECHNICAL FIELD

The present invention relates to a security thread and a manufacturing method thereof, particularly to a security thread for preventing a theft of illegally taking away a commodity on sale, a public facility equipment, and the like without permission and to a manufacturing method of the security thread.

BACKGROUND ART

In a conventional art, for the aforementioned object, a magnetic member is disposed on a back surface of a bar code bonded to a commodity or a tag indicating a commodity price, quality, and the like to correspond to a sensing system in which magnetism is utilized, and an action of illegally taking away the commodity or the like is monitored and prevented.

However, the aforementioned constitution has problems that a label or a tag is easily separated from the commodity, existence of the magnetic member is easily recognized, the member is cut or destroyed and a function of a theft preventing tag cannot be fulfilled. Moreover, in some form of the commodity as an object, it is difficult to dispose a seal or a tag for security.

DISCLOSURE OF THE INVENTION

Therefore, attention has been given to the aforementioned conventional situations and problems to develop the present invention, and an object of the present invention is to solve the problems and to provide a security thread whose existence is not clarified, which is prevented beforehand from being removed, which can also be attached to a commodity of a form heretofore regarded as difficult and whose use purpose range is enlarged and to provide a manufacturing method of the security thread.

As a result of various examinations of a security product constitution in which magnetic characteristics of a soft magnetic material are applied, the present inventor et al. have found that a security thread structured by using a soft magnetic fiber provided with flexibility in a core member and covering the core member with a cover member of a nonmetal material can be used to achieve the aforementioned object, and have completed the present invention. That is to say, according to a first aspect of the present invention, there is provided a security thread constituted of a core member comprising a soft magnetic fiber, or the soft magnetic fiber and a core thread, and a cover member comprising a nonmetal material to cover the core member. Moreover, according to a second aspect of the security thread of the present invention, the core member comprising the soft magnetic fiber, or the soft magnetic fiber and core thread, and a member comprising a semi-hard magnetic material are covered with the cover member comprising the nonmetal material. According to a third aspect of the security thread of the present invention, the soft magnetic fiber or the core member comprising the soft magnetic fiber and a thermal welding thread are covered with the cover member comprising the nonmetal material. Furthermore, according to the present invention, there is also provided a manufacturing method of the aforementioned security thread.

BEST MODE FOR CARRYING OUT THE INVENTION

Figure 1:
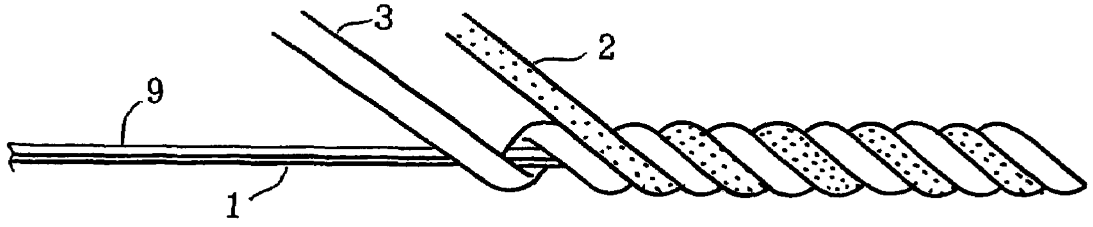
FIG. 1 is a diagram showing a structure of one embodiment of a security thread of the present invention.

A preferred embodiment of a security thread of the present invention will next be described.

When a soft magnetic fiber used as a core member in the present invention is a fiber constituted of a metal magnetic material indicating soft magnetic properties, a crystal structure (crystal/non-crystal) or an alloy composition is not particularly limited, but a fiber of a metal material having a high permeability of 1000 or more in an excitation magnetic field of 5 mOe, 1 kHz is preferable. As the metal material of the present invention, permalloy indicating the aforementioned high permeability characteristic, Fe—Si based alloy, amorphous metal, and the like can be used, but among all an amorphous metal fiber mainly composed of Co—Fe—Si—B is particularly preferable because the permeability in the excitation magnetic field of 5 mOe, 1 kHz indicates a high permeability of 10000 or more.

Moreover, an amorphous metal fiber mainly composed of Fe—Co—Si—B, indicating a magnetic characteristic with a large Barkhausen discontinuity to rapidly cause magnetization reverse in a certain specific excitation magnetic field value (reverse magnetic domain forming limit magnetic field value) in a magnetization process can also be a particularly preferable material as the soft magnetic fiber.

Furthermore, for a small-width amorphous metal ribbon mainly composed of Fe—Si—B, Fe—Co—Si—B or Co—Fe—Si—B, and provided with a sectional structure in which a width is in a range of 0.2 mm to 1.5 mm, thickness is in a range of 0.01 mm to 0.05 mm, and a ratio of thickness to width (thickness/width) is in a range of 0.02 to 0.4, since the aforementioned unique soft magnetic characteristic is indicated, the ribbon can substantially be regarded as the soft magnetic fiber with respect to the security thread of the present invention, and can be exemplified as a particularly preferable material according to the present invention.

A core thread in the present invention is used as the core member together with the aforementioned soft magnetic fiber, and a bundle filament made up of various synthetic fibers or natural fibers, twist filament, thermal welding thread, polynosics, or spun rayon can be used. Moreover, for a core thread size, the thread is preferably thicker than the soft magnetic fiber.

Here in the security thread of the present invention, in order to unify the soft magnetic fiber and core thread with a cover member described later, and prevent the soft magnetic fiber from falling off or prevent a fingertip or a commodity from being damaged by the soft magnetic fiber, the core thread is preferably provided with a thermal welding thread. Additionally, the thermal welding thread preferably has a size of about 100 to 200 deniers and melting temperature of about 100° C.

Furthermore, in the security thread of a second aspect of the present invention, in order to deactivate the magnetic characteristic of the soft magnetic fiber, it is necessary to use a semi-hard magnetic material together with the aforementioned core member. Here, deactivation in the present invention means that the magnetic characteristic of the soft magnetic fiber is changed by magnetizing the semi-hard magnetic material. That is to say, during deactivation, the security thread containing the soft magnetic fiber is not easily sensed by a detection system. In the present invention, as the semi-hard magnetic material used to impart such deactivating function, the semi-hard magnetic material whose coercive force is in a range of 10 oersteds to 500 oersteds can be used, and various Fe alloys or Co alloys can be used. Among all an Fe—Co—V based alloy or an Fe—Co—Cr based alloy is a preferable material in the present invention because the alloy indicates a superior semi-hard magnetic characteristic in a range of 30 oersteds to 150 oersteds. Additionally, as a form of the semi-hard magnetic material in the present invention, a linear material having a circular section, elliptical section or polygonal section, or a thin plate or a thin band having a thin rectangular section can be used. Moreover, when a semi-hard magnetic material with a length of 3 mm or more is used, the magnetized semi-hard magnetic material can preferably impart a sufficient deactivating function to the security thread.

The cover member in the present invention visually or mechanically protects the soft magnetic fiber, and various materials and constitutions can be used in accordance with a purpose for which the security thread of the present invention is utilized. Here, examples of the material used in the cover member of the present invention include a thread or a band (tape-shaped) formed of synthetic fibers such as nylon and polyester or natural fibers, and a gold thread or a silver thread constituted of various materials can also be used. In an example of the gold thread or the silver thread, aluminum is particularly preferably vacuum-deposited on one surface of a polyester film or another polymeric film, or a metallic thread formed by coloring the film in blue, red, green or another arbitrary color can also be used, and commodity distinction can also be suggested by this color.

It is necessary to cover the core member with the cover member used in the present invention, and prevent the metallic core member from being exposed. That is to say, the metallic core member can be covered with the nonmetallic cover member as if the security thread of the present invention were nonmetallic and were not provided with a security function. Thereby, the original function of the security thread of the present invention is little recognized, and the security thread can therefore effectively be prevented from being illegally removed.

Figure 2:
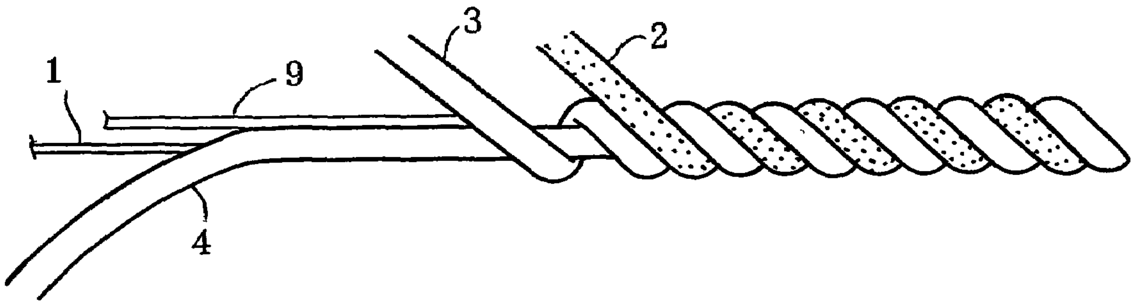
FIG. 2 is a diagram showing another embodiment of the security thread of the present invention.

This cover member can be constituted as follows. For example, as shown in FIG. 1, two cover members 2, 3 alternately cover a periphery of a soft magnetic fiber 1 in a double spiral shape without any gap. Moreover, as shown in FIG. 2, the soft magnetic fiber 1 is used as a core to dispose a core thread 4 on the periphery, both members are used as a core member 5, and two cover members 2, 3 alternately cover a periphery of the core member in the double spiral shape without any gap. Additionally, the cover members 2, 3 may be of one type and can of course be used in a single spiral shape, and numeral 9 denotes a thermal welding thread.

Figure 3:
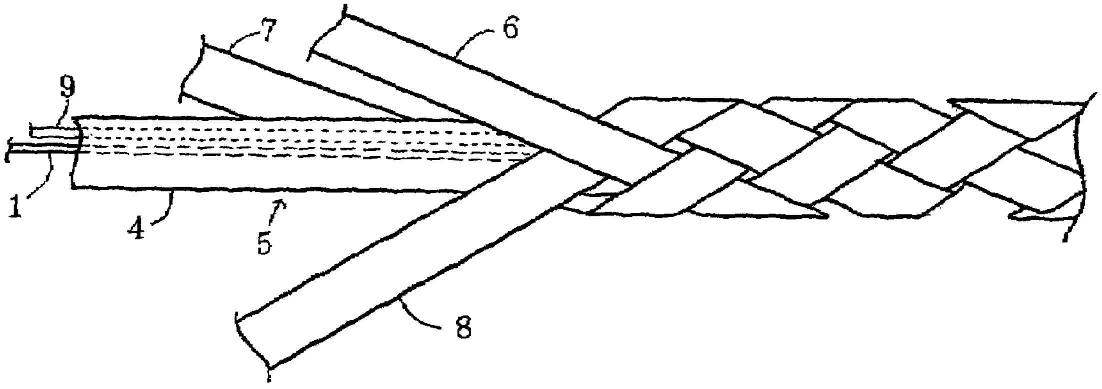
FIG. 3 is a diagram showing still another embodiment of the security thread of the present invention.

Moreover, as the cover member of the present invention, three or more gold or silver threads are used, gold or silver threads 6, 7, 8 are allowed to intersect one another obliquely, forward and backward or vertically in the periphery of the core member 5 by a constant method as shown in FIG. 3, and driven and tightened to form a braid structure in a preferable example. Numeral 9 denotes the thermal welding thread.

Figure 4:
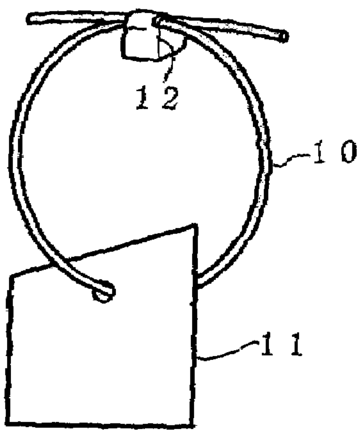
FIG. 4 is a diagram showing one example of a use state of the security thread of the present invention.
Figure 5:
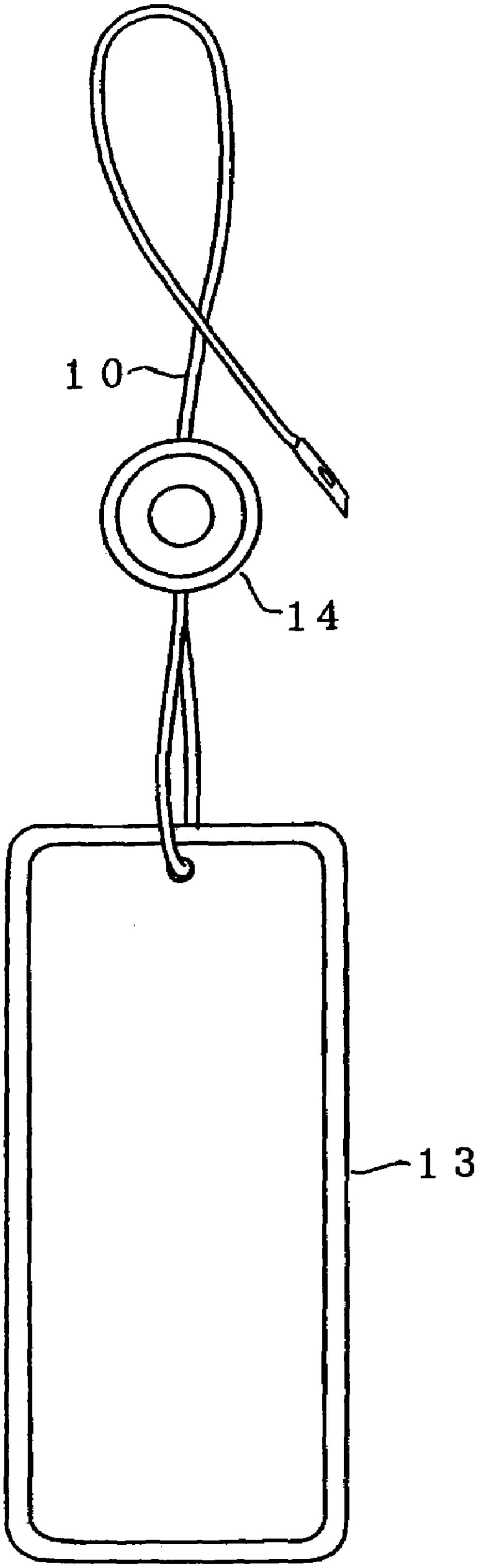
FIG. 5 is a diagram showing one example of a state in which the security thread of the present invention is used in a brand tag.
Figure 6:
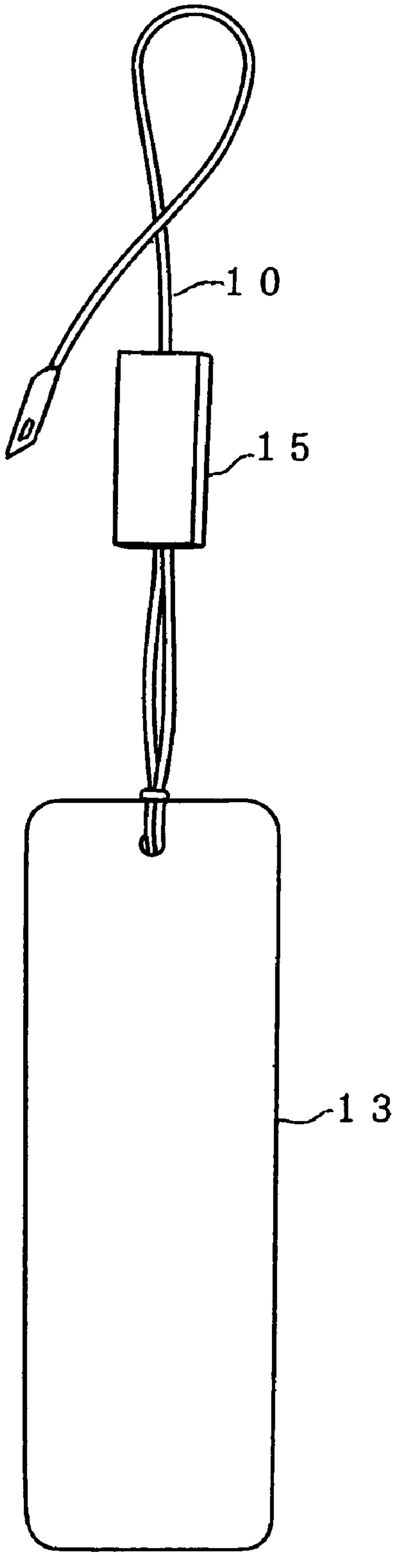
FIG. 6 is a diagram showing another example of the state in which the security thread of the present invention is used in the brand tag.

Furthermore, FIGS. 4 to 6 show a use state of the security thread which embodies the present invention, and in FIG. 4 a security thread 10 is passed through an insertion hole of a tag 11 to form a ring shape, and an end of the thread is passed through a stopper member 12 to prevent the tread from falling-off. FIGS. 5 and 6 show an example in which the thread is used in a brand tag 13, and a stopper member 14 or 15 for passing the thread, preventing the thread from falling off, and fixing the thread is interposed midway. The stopper member 12, 14 or 15 can be distinguished by colors such as red, black and green, and the members can be classified by sizes, types, and the like.

It is necessary to manufacture the security thread of a first aspect of the present invention by constituting the core member by the soft magnetic fiber, or the soft magnetic fiber and core thread, and subsequently covering the periphery of the core member with one or two or more cover members, and as a covering method of the cover member, a method of winding the cover member in a spiral shape to cover the periphery, or a method of using the cover member and forming the braid structure to cover the periphery can be used to manufacture the thread. Moreover, in the manufacturing method of the second security thread of the present invention, it is necessary to cover peripheries of both the core member of the soft magnetic fiber or the soft magnetic fiber and core thread and the semi-hard magnetic material with the cover member. Additionally, in the manufacturing method of the security thread of the present invention, a method of using the thermal welding thread together with the soft magnetic fiber as the core member, covering the core member with the cover member and subsequently performing a heat treatment at 80° C. to 130° C. to manufacture the security thread can be exemplified as a particularly preferable manufacturing method example. However, when a natural fiber is used as a material of the cover member, it is natural to perform the heat treatment after the core member is covered with the cover member.

Additionally, the security thread of the present invention can easily be manufactured by using the aforementioned constituting elements and applying the existing thread manufacturing technique.

Since the security thread of the present invention is constituted of the aforementioned elements, appearance of the thread appears is completely the same as that of a usual thread. Therefore, the thread is attached to a commodity or an equipment without any feeling of difference, and a theft preventing function can easily be imparted. For example, a method of utilizing flexibility of the soft magnetic fiber of the core member of the security thread of the present invention, and deforming and using the thread in a ring shape as shown in FIG. 4, and a use method shown in FIGS. 5 and 6 are preferable as an application method of the security thread of the present invention because the thread can easily be attached to the commodity or the equipment together with the tag or the like.

Moreover, the security thread of the present invention can be placed in a pipe formed of polyethylene, polypropylene, biodegradable resin or another resin, and with such structure, the security thread can be used as a flexible rod-like member, and the thread can also be contained in a case box in which the commodity, and the like are contained.

In the security thread of the present invention, since the soft magnetic fiber provided with the superior magnetic characteristic is used in the core member, the security thread is easily magnetized in an alternating field generated in a magnetic theft preventing gate, and a detection signal is generated in a detection coil in the gate. Therefore, when the thread is used together with various magnetic theft preventing systems, the security function is sufficiently fulfilled.

EXAMPLES

The present invention will be described hereinafter by way of examples in more detail, but the present invention is not limited only to the examples.

Example 1 (No. 1)

Used as the soft magnetic fiber 1 was an amorphous metal fiber being high in general-purpose properties, indicating a high permeability of 5000 or more, being of a Co—Fe—Si—B base and having a linear diameter of 100 μm. Subsequently, the thermal welding thread 9 with a diameter of 200 d and the core thread 4 formed of a nylon bundle filament with a diameter of 200 d were used to form the core member together with the soft magnetic fiber. Subsequently, two polyethylene terephthalate threads with each diameter of 1000 d were used in the cover member to cover the periphery of the core member in the spiral shape, and the security thread of the structure of FIG. 2 was manufactured. Additionally, in this forming process, after the periphery was covered with the cover member, the thread was subjected to a drying heat treatment at 120° C. for 30 minutes.

Example 2 (No. 2)

As the cover member, three nylon threads with each diameter of 1260 d were used to cover the periphery of the core member used in Example 1 in the spiral shape, and the drying heat treatment was performed to form the security thread.

Example 3 (No. 3)

The peripheries of the core member used in Example 1, and core member excluding the core thread 4 of the nylon bundle filament with a diameter of 200 d were covered with two nylon threads with each diameter of 1260 d as the cover member in the spiral shape, and the drying heat treatment was performed to form the security thread.

Example 4 (No. 4)

The periphery of the core member used in Example 1 was covered with three nylon threads with each diameter of 630 d as the cover member in the spiral shape, and the drying heat treatment was performed to form the security thread.

Example 5 (Gold Thread)

A gold thread to which a colored cellophane material was thermally welded to an aluminum foil was used in the cover member to cover the peripheries of the core member used in Example 1 and spun rayon of a bundle or twist thread in a Kara-8-thread (Kara-hachi-da) braid shape, and the drying heat treatment was performed to form the security thread of FIG. 3.

Subsequently, the respective formed security threads were used to form a ring with a cut length of 150 mm and a diameter of 40 mm, and a ring with a cut length of 100 mm and a diameter of 25 mm. Subsequently, a magnetic security system of Dialock Co., Ltd. of Canada (commodity name: EM-1300 system) was used to examine the security function. Here in the system, a gate width was set to 900 mm for the ring with a diameter of 40 mm, and the gate width was set to 900 mm or 800 mm for the ring with a diameter of 25 mm. Moreover, for a sensitive level, under voltage adjustment on conditions of red LED 1.6 V, green LED 1.25 V and red LED 1.6 V, green LED 1.45 V, presence/absence of detection was examined. Additionally, with the 40 mm ring, the presence/absence of detection was examined while the state was unchanged. However, the 25 mm ring is considered to be used for small things such as a ring and eyeglasses. Therefore, while the ring was placed in a wallet, a coil purse, or a bag, the presence/absence of detection was examined.

Examination results are shown in the following Table 1.

TABLE 1

Detection Experiment of Security Thread

| | Sample No. | | | | | |
|---|---|---|---|---|---|---|
| | 40ϕ ring | | 25ϕ ring | | | |
| Voltage adjustment | Red 1.6 V/green 1.25 V | Red 1.6 V/green 1.45 V | Red 1.6 V/green 1.25 V | | Red 1.6 V/greed 1.45 V | Red 1.49 V/green 1.25 V |
| Gate width | 900 mm | 900 mm | 900 mm | 800 mm | 800 mm | 800 mm |
| No. 1 shape | fourthly good 40 cm from antenna ○ ∞ | fourthly good ○ ○ ∞ | little more than 30 cm from antenna | all good ○ ○ | good in coin purse, wallet and bag | good in coin purse, wallet and bag |

TABLE 1-continued

Detection Experiment of Security Thread

| | Sample No. | | | | | |
|---|---|---|---|---|---|---|
| | 40ϕ ring | | 25ϕ ring | | | |
| Voltage adjustment | Red 1.6 V/green 1.25 V | Red 1.6 V/green 1.45 V | Red 1.6 V/green 1.25 V | | Red 1.6 V/greed 1.45 V | Red 1.49 V/green 1.25 V |
| Gate width | 900 mm | 900 mm | 900 mm | 800 mm | 800 mm | 800 mm |
| No. 2 shape | secondly good 45 cm from antenna ○ ∞ | secondly all good ○ ○ ∞ | 40 cm from antenna | all good ○ ○ | good in coin purse, wallet and bag | good in coin purse, wallet and bag |
| No. 3 shape | firstly good 45 cm from antenna ○ ∞ | firstly all good ○ ○ ∞ | little more than 40 cm from antenna | all good ○ ○ | good in coin purse, wallet and bag | good in coin purse, wallet and bag |
| No. 4 shape | thirdly good little more than 40 cm from antenna ○ ∞ | thirdly good ○ ○ ∞ | little more than 30 cm from antenna | all good ○ ○ | good in coin purse, wallet and bag | good in coin purse, wallet and bag |
| Tagged No. 2 No. 3 | good | good in coin purse, wallet and bag | little more than 40 cm from antenna | all good ○ ○ | good in coin purse, wallet and bag | good in coin purse, wallet and bag |
| Gold thread Kara-8-thread | Good ○ ∞ | all good ○ ○ ∞ | little more than 40 cm from antenna | all good ○ ○ | good in coin purse, wallet and bag | good in coin purse, wallet and bag |
| Kara-8-thread Tagged | good | good in coin purse, wallet and bag | little more than 40 cm from antenna | all good ○ ○ | good in coin purse wallet and bag | good in coin purse, wallet and bag |

No. 1: PET 1000/1 × 2: covering: drying heat treatment
No. 2: NY 1260/1 × 3: covering: drying heat treatment
No. 3: NY 1260/1 × 2: covering: drying heat treatment
No. 4: NY 630/1 × 3: covering: drying heat treatment
Kara-8-thread (gold thread): aluminum foil/cellophane coloring/welding As a result, it has been confirmed as shown in Table 1 that for each of the security threads of No. 1 to No. 4 and gold thread according to the present invention, an area sensed in a gate is broad, and that the security thread has a sufficient performance as a mark for security. Moreover, it has been found that when the sensing performance is ranked on respective experiment conditions based on an extent of the area sensed by the system, the 25 mm ring satisfactorily functions at all sensing levels. On the other hand, it has been confirmed as shown in Table 1 that the 40 mm ring is satisfactory in order of No. 3 as best, No. 2 as second, No. 4 as third, and No. 1 as fourth.

Additionally, the aforementioned result was obtained with a circular shape (ring), but it has also been confirmed that there is no particular problem in sensing characteristic even when the security threads of No. 1 to No. 4 and gold thread of the present invention with each cut length of 150 mm are deformed to an elliptical shape from the ring shape, or even when the security thread is once twisted and deformed into an 8-shape.

Example 6

Figure 7:
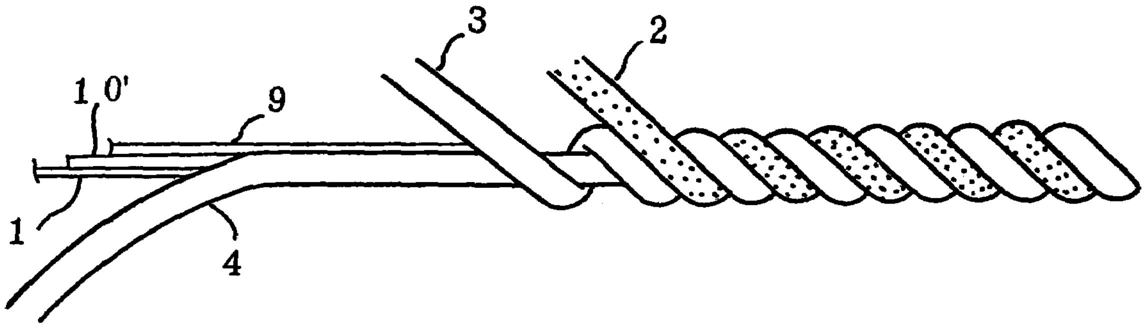
FIG. 7 is a diagram showing still another embodiment of the security thread of the present invention.

The same amorphous metal fiber 1 and core thread 4 of the nylon bundle filament as those of Example 1 were used to form the core member, further as shown in FIG. 7, the Fe—Co—V fine wire 10' (with a coercive force of 120 oersteds) of the semi-hard magnetic material with a diameter of 80 μm in a demagnetized sate was used in a deactivating member, the periphery was covered with the cover members 2, 3 of two polyethylene terephthalate threads with each diameter of 1000 d in the spiral shape, and the security thread was manufactured. Subsequently, the security function was examined similarly as Example 1. As a result, it has been confirmed that the security thread is provided with a sufficiently satisfactory security function. Subsequently, it was checked in the following method whether or not the fine wire 10' sufficiently fulfilled its function as the deactivating member.

That is to say, since detection of the security thread by the security system is requested to be disabled on condition of payment for a commodity price, a permanent magnet is disposed in the vicinity of the security thread of Example 6, and the semi-hard magnetic material disposed inside is magnetized and placed in a deactivated state. As a result, it has been found that the security thread of the deactivated state has no area to be sensed in the system. That is to say, it has been confirmed that the security thread provided with the semi-hard magnetic material is sufficiently useful as a product which can be deactivated.

Example 7

The security thread of the structure of FIG. 2 was manufactured similarly as Example 1, except that a Co—Fe—Si—B based amorphous metal ribbon having a sectional structure with a width of 0.75 mm and thickness of 0.03 mm and indicating a high permeability of 5000 or more was used as the soft magnetic fiber 1.

Subsequently, the formed security thread was cut to obtain a length of 150 mm and a ring with a diameter of 40 mm was formed. Subsequently, similarly as Example 1, the magnetic security system was used to examine the security function.

As a result, it has been found that the ring product of Example 7 has a large area to be sensed in the system gate, and has a detecting function comparable to that of No. 3 of Example 3.

That is to say, it has been confirmed that even when the amorphous metal ribbon is used as the soft magnetic fiber, the sufficiently useful security thread can be obtained.

Example 8

The security thread of the structure of FIG. 2 was manufactured similarly as Example 6, except that the Co—Fe—Si—B based amorphous metal ribbon having a sectional structure with a width of 0.75 mm and thickness of 0.03 mm and indicating a high permeability of 5000 or more was used as the soft magnetic fiber 1.

Subsequently, the formed security thread was cut to obtain a length of 150 mm and the ring with a diameter of 40 mm was formed. Subsequently, similarly as Example 1, the magnetic security system was used to examine the security function. As a result, it has been found that the ring product of Example 8 has a large area sensed in the system gate, and has a sufficient detecting function.

Furthermore, the permanent magnet was disposed in the vicinity of the security thread, and the semi-hard magnetic material disposed inside was magnetized and placed in the deactivated state. Subsequently, when the detection performance of the security thread of the deactivated state was confirmed in the system, it was found that the security thread was not sensed in any area. That is to say, it has been confirmed that the security thread provided with the semi-hard magnetic material is sufficiently useful as the product which can be deactivated.

POSSIBILITY OF INDUSTRIAL UTILIZATION

A security thread and manufacturing method of the security thread according to the present invention are constituted as described above. Therefore, since appearance of the security thread cannot be distinguished as a security product, there is no possibility that the security thread is separated or cut away. Even when the security thread is removed, it maintains its function in a wallet or a bag, and can be sensed so that a satisfactory security state can be achieved. Moreover, the security thread can advantageously easily be attached even to a small thing or a box material to which it has been difficult to attach the security thread, and according to the present invention there is provided a practically useful security product.

The invention claimed is:

1. A security thread comprising:

a core member selectively having either a) a fiber made of a soft magnetic material having permeability of 1000 or more, or b) a fiber made of a soft magnetic material having permeability of 1000 or more and a core thread bundled with the fiber coextensive therewith;

a thermal welding thread bundled with said core member coextensive therewith; and a cover member made of a nonmetal material covering said core member and said thermal welding thread in such a manner that said cover member is in contact with either or both of said core member and said thermal welding thread;

said security thread forming a loop in use.

2. A security thread comprising:

a core member selectively having either— a) a fiber made of a soft magnetic material indicating a magnetic characteristic with a large Barkhausen discontinuity to rapidly cause magnetization reversal, or b) a fiber made of a soft magnetic material indicating a magnetic characteristic with a large Barkhausen discontinuity to rapidly cause magnetization reversal and a core thread bundled with the fiber and coextensive therewith;

a member bundled with said core member and coextensive therewith and made of a semi-hard magnetic material which can deactivate the magnetic characteristic of the soft magnetic material;

a thermal welding thread bundled with said core member and coextensive therewith; and a cover member made of a nonmetal material contacting and covering said core member and said thermal thread;

said security thread forming a loop.

3. A manufacturing method of a security thread comprising the steps of:

preparing a core member having a fiber made of a soft magnetic material having permeability of 1000 or more, or a fiber made of a soft magnetic material having permeability of 1000 or more and a core thread by bundling the same with the fiber coextensively therewith;

covering a periphery of said core member by a cover member made of a nonmetal material so that said periphery is surrounded by said cover member and is not exposed; and deforming said security thread so that said security thread forms a loop in use.

4. A manufacturing method of a security thread comprising the steps of:

preparing a core member having a fiber made of a soft magnetic material indicating a magnetic characteristic with a large Barkhausen discontinuity to rapidly cause magnetization reversal, or a fiber made of a soft magnetic material indicating a magnetic characteristic with a large Barkhausen discontinuity to rapidly cause magnetization reversal and a core thread by bundling the same with the fiber coextensively therewith;

covering a periphery of said core member by a cover member made of a nonmetal material so that said periphery is surrounded by said cover member and is not exposed; and deforming said security thread so that said security thread forms a loop in use.

* * * * *